UNITED STATES PATENT OFFICE.

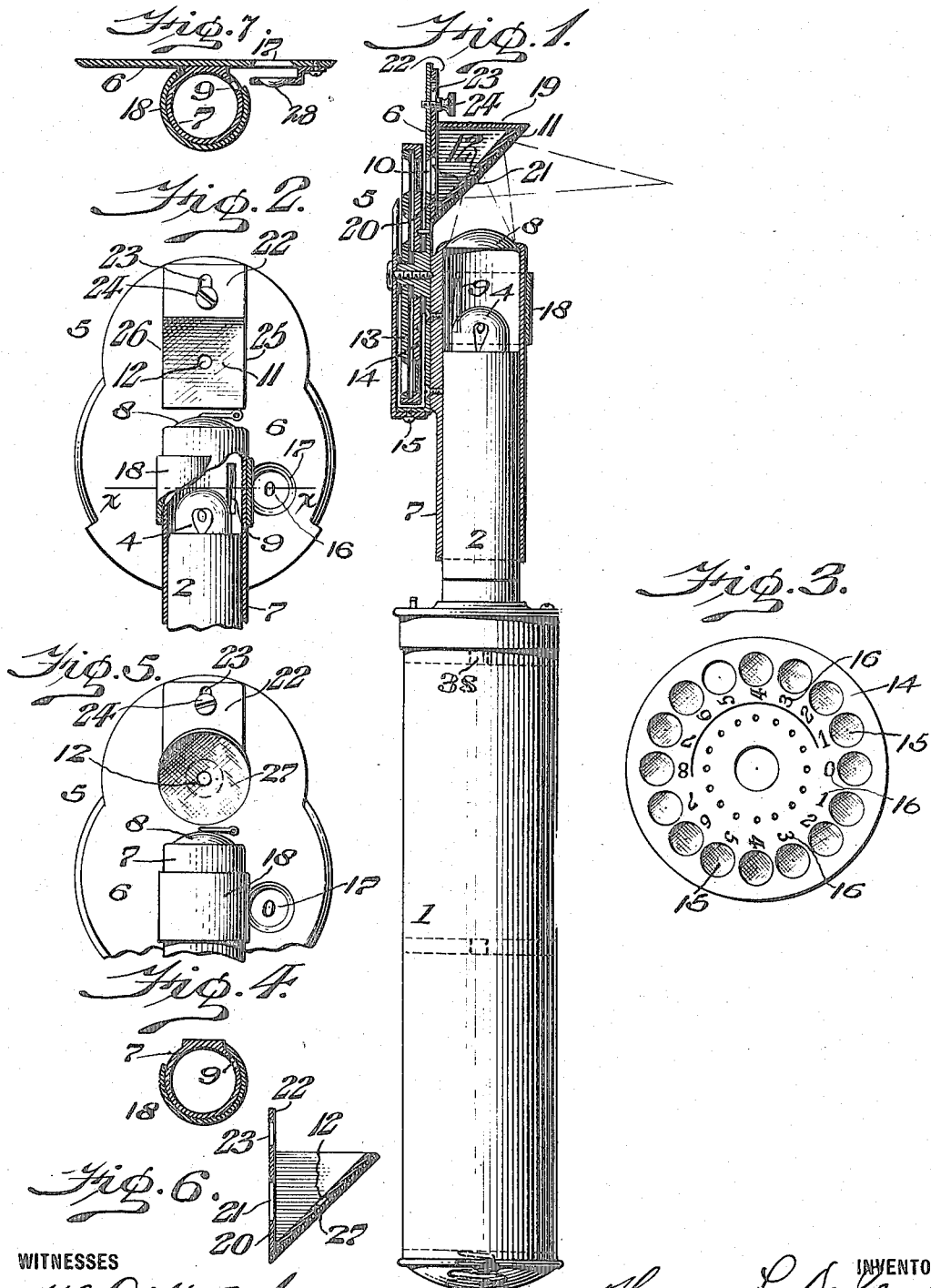

HENRY L. DE ZENG, OF MAPLE SHADE, NEW JERSEY.

OPHTHALMOSCOPE OR OTHER OPTICAL INSTRUMENT.

1,128,859. Specification of Letters Patent. Patented Feb. 16, 1915.

Application filed January 20, 1914. Serial No. 813,160.

*To all whom it may concern:*

Be it known that I, HENRY L. DE ZENG, a citizen of the United States, residing at Maple Shade, county of Burlington, State of New Jersey, have invented a new and useful Ophthalmoscope or other Optical Instrument, of which the following is a specification.

My invention relates to new and useful ophthalmoscope or other optical instruments, with indicators or indications thereon, and provided with a source of light, and consists of means for illuminating said indicators or indications by said source of light, whereby readings can be taken at all times.

It further consists of means for controlling the illumination of said indicators or indications.

It further consists of a new and novel means for adjustably mounting the reflector and whereby different reflectors may be quickly and easily substituted.

It further consists of other novel features of construction, all as will be hereinafter fully set forth.

For the purpose of illustrating my invention, I have shown in the accompanying drawings, one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation, partly in section, of an optical instrument, here shown as an ophthalmoscope, embodying my invention. Fig. 2 represents a front elevation of a portion of the instrument, with parts broken away. Fig. 3 represents one of the disks employed. Fig. 4 represents a horizontal sectional view of the tube and the shutter employed. Fig. 5 represents a front elevation of a portion of the instrument, showing a different form of reflector. Fig. 6 represents a vertical, sectional view through the reflector shown in Fig. 5. Fig. 7 represents a horizontal sectional view of portions of the device showing a lens mounted to magnify the indicators.

Similar numerals of reference indicate corresponding parts in the figures.

Referring to the drawings: In the drawings, I have shown a construction embodying my invention, in which the same is applied to an ophthalmoscope, and which I have found operates successfully in practice, but it will be evident that changes may be made in the construction, the arrangement of the parts may be varied, and other instrumentalities may be employed, which will come within the scope of my invention, and I do not therefore desire to be limited in every instance to the exact form as herein shown and described, but desire to make such changes that may be necessary, as well as to apply the invention to any use and to employ the same with any form of instrument to which it may be applicable.

1 designates a handle, which may be of any suitable style and which I preferably desire to form as a casing providing a chamber for the reception of a self-contained source of current supply such as a battery. Suitably connected with the said handle is a sleeve 2, which is of any desired construction, and which is connected with the handle in any suitable or desired manner. On the sleeve 2 I provide threads 3 for the reception and engagement with a source of light 4, such as a lamp, it being understood that suitable conducting means for the current to the lamp may be employed, which will be hereinafter set forth.

5 designates the optical instrument shown in the drawings, as an ophthalmoscope, which is one form of instrument which is adapted for my invention, and which can be used with the handle 1, said ophthalmoscope consisting of a body portion or support 6, which is suitably connected or carried by a tube 7, adapted for movement or adjustment upon the sleeve 2, whereby the position of the ophthalmoscope with respect to the source of light may be varied. The tube 7 is provided with a condenser 8 which is situated at a suitable point, preferably at its upper end. In the tube 7, I provide a slot 9, which, when the parts are assembled, is situated laterally with respect to the lamp or source of light, and which is suitably located with respect to body portion 6, as will be hereinafter described.

At a suitable point in the body portion or support 6, preferably at the upper portion thereof, I provide the sight opening 10, and upon the front face of the body portion, at a suitable point with respect to the sight opening, is mounted a mirror or reflector 11, which is also provided with a sight opening 12, in suitable relation to the first sight opening, it being understood that the said reflector 11 is suitably positioned with respect to the light source 4 and the condenser 8, preferably with its reflecting surface at an angle to said source of light, in order that the rays of light may be directed to said reflector 11 to be reflected thereby to the desired point, or to the object, as is customary.

Rotatably mounted upon the body portion or support 6 are suitable disks 13 and 14, each having a series of lenses 15 therein, and any desired number of blank openings, whereby it will be understood that the lenses or the blank openings may be successively or routinely brought into register with the sight opening, for the purpose of making the desired tests. The said disks are provided with suitable notations, indications or indicators 16 that may be desired or necessary, in order that the lens value at the sight opening is indicated. At a suitable point in the support 6, I provide an aperture 17, which is located laterally with respect to the lamp or source of light and in suitable relation with respect to the said slot 9 in the tube, it being understood that at said aperture, the said notations or indications on one of the disks will be routinely or successively brought, in such a manner that the lens, blank openings, or lens value, at the sight opening will be indicated by the indication or indicator 16 at the said aperture, and by means of the slot 9, light from the light source will be directed upon the aperture, and the indication appearing thereat, so that these indications or indicators at the aperture can be read easily and quickly at all times. From this it will be understood that I have provided means for illuminating lens indicating means by a source of light and, as here shown, I employ the source of light, the rays from which are adapted to be directed to the object to be tested. It will be seen further by this means it will not be necessary for the operator to employ a light, should the test be made in a dark room, in order to read an indication, nor would it be necessary for him to stop the test and go to a lighted room for the purpose of reading the indications, since, he can, at any and all times, read the indications as they appear at the said aperture. In some instances, it may be of advantage to shut off the light from the aperture and for this purpose I have provided a shutter or closure 18, movably mounted with respect to the said slot 9, and which can be located in order to permit the light to strike the aperture and the indication thereat or the light from the slot may be closed off, if desired.

While it will be understood that any suitable form of reflector or mirror may be employed, I have provided a novel means for adjustably mounting the reflector or mirror on the instrument and whereby different forms of reflectors may be removed and connected in a quick and convenient manner.

In the construction shown in Figs. 1 and 2, the reflector 11 is of the closed type, having an upper wall 19 and the rear wall 20, having an opening 21 therein, and having said wall 20 extending upwardly beyond the top wall 19, to form the ear 22, having an elongated slot 23 therein. Passing said slot is the set screw 24, having a head for engagement with the ear 22 and which is adapted for suitable engagement with the body portion 6 of the instrument, in order that by proper operation of the screw 24, the position of the reflector may be varied with respect to the condenser 8. In this form of the reflector, the sides 25 and 26 are straight and the reflector surface is longer than it is wide, which form of mirror is best adapted for the direct method of examination, as it offers the greatest amount of reflecting surface, and, at the same time, produces the smallest corneal reflex.

In the construction of reflector shown in Figs. 5 and 6, I have illustrated the round type of mirror 27 set upon an open top mounting, so that any light passing through the sight opening will be lost, vertically, in space. This form of mirror may be employed for the indirect method of examination.

In some instances I have found that it will be of advantage to provide means for magnifying the indicator, which appears at the opening 17, and for accomplishing this result, I have shown in Fig. 7, a construction which will operate successfully. To accomplish this result, I mount a lens 28, in any suitable manner, upon the body portion 6 of the ophthalmoscope, said lens being suitably positioned with respect to the said opening 17, in order that the operator may view the indicator appearing at the opening, through the said lens. This construction may not be necessary in every instance, but I wish to use the same if the same is desirable, such as in the case where the eyes of the operator are not quick to determine near objects, without the set of lenses.

It will of course be understood that the lens is so mounted that it or its mounting will not prevent the rays of light which pass through the slot 9 for illuminating the indicator exposed at the opening 17, and said lens may be mounted stationarily, or may be adjustably mounted in order that it can be swung into or out of operative position, as desired.

It will now be apparent that I have devised a novel and useful construction of an optical and other instrument, which embodies the features of advantage enumerated as desirable in the statement of the invention and the above description, and while I have, in the present instance, shown and described a preferred embodiment thereof, which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In an optical instrument, a source of light, means for directing light from said light source to the object, indicators on said instrument, and means for illuminating said indicators by illumination from said light source.

2. In an optical instrument, a source of light, means for directing light from said light source to the object, indicators on said instrument, means for illuminating said indicators by lateral illumination from said light source.

3. In an optical instrument, a source of light, a reflector, indicators on said instrument, lateral to said source of light, means for illuminating said indicators by said source of light, and means for controlling the illumination of said indicators.

4. In an optical instrument, a sight opening, lenses adapted to be brought to register with said sight opening, lens indicating means in suitable relation to said lenses, a lamp, and means for causing illumination of said lens indicating means by said lamp.

5. In an optical instrument, a sight opening, a series of lenses adapted to be brought to register with said sight opening, a lamp, means for directing light from said lamp to the object, lens indicating means, and means for illuminating said lens indicating means by said lamp.

6. In an optical instrument, the combinanation of a sight-opening, a series of lenses adapted to register with said sight opening, an electric lamp, a reflector for directing light from said lamp to the object, means indicating the lens values obtained at said sight opening, and means for illuminating said lens indicating means by said lamp.

7. In an optical instrument, a body portion having a sight opening, a series of lenses adapted to be brought into operative position at said sight opening, a reflector, an electric lamp, a condenser located between said lamp and said reflector, lens indicating means adapted to be brought to register with an aperture, a tube surrounding said lamp and an opening in said tube for illuminating the lens indicating means at said aperture.

8. In an ophthalmoscope having a source of light, a sight opening, a reflector, and means for adjusting said reflector to vary the relation of the same with respect to said source of light.

9. In an ophthalmoscope, a handle, a source of light, a body portion having a sight opening, a reflector, and a support for said reflector adjustably mounted upon said body portion.

10. In an optical instrument, a source of light, means for directing light from said light source to the object, indicators upon said instrument, means for illuminating said indicators by illumination from said light source, and means for magnifying the said indicators.

11. In an optical instrument, a source of light, means for directing light from said light source to the object, indicators on said instrument, means for illuminating said indicators by illumination from said light source, and a lens suitably positioned with respect to said indicators, whereby the same will be magnified.

12. In an optical instrument, a body portion having an opening, a series of lenses mounted thereon, adapted to be positioned with respect to said opening, indicators for indicating which lens value, if any, is situated at said opening, and means for magnifying the indicator for the lens at the opening.

13. In an optical instrument, a body portion having an opening therein, a series of lenses mounted on said body portion and adapted to be positioned at said opening, a series of indicators for indicating which lens value, if any, is positioned at said opening, and means for magnifying said indicators.

14. In an optical instrument, a body portion having a sight opening therein, and a second opening, a series of lenses rotatably mounted upon said body portion and adapted to be positioned at said first mentioned opening, a series of indicators adapted to be positioned at said second mentioned opening to indicate the lens value, if any, which is in operative position at said first mentioned opening, and means for magnifying the indicator positioned at said second mentioned opening.

HENRY L. DE ZENG.

Witnesses:
C. D. McVay,
H. M. Tafferty.